April 16, 1968 G. P. GRANT, JR 3,377,913
PHOTOGRAPHIC DOCUMENT COPYING DEVICE
Filed March 16, 1965 9 Sheets-Sheet 1

INVENTOR.
G. PETER GRANT, JR.
BY
ATTORNEY

April 16, 1968 G. P. GRANT, JR 3,377,913
PHOTOGRAPHIC DOCUMENT COPYING DEVICE
Filed March 16, 1965 9 Sheets-Sheet 2

INVENTOR.
G. PETER GRANT, JR.
BY
ATTORNEY

United States Patent Office 3,377,913
Patented Apr. 16, 1968

3,377,913
PHOTOGRAPHIC DOCUMENT COPYING
DEVICE
G. Peter Grant, Jr., Little Hill, R.D. 1,
Warner, N.H. 03278
Filed Mar. 16, 1965, Ser. No. 440,139
23 Claims. (Cl. 88—24)

ABSTRACT OF THE DISCLOSURE

A photographic document copying device in which a document may be reproduced either in 1 to 1 size or in reduced size by selecting one of two paths of travel through the machine. Light sensitive paper of different widths are carried in rolls within the machine whereby the operator can selectively print the desired copy size. Negative photographic frames can also be printed upon a continuous strip of light sensitive material by feeding them through another selected path of travel through the machine. The documents are developed within the machine as the exposed material travels therethrough. Documents printed by the machine can also be projected for reading.

---

This invention relates to a copying machine which can be adjusted to make copies of documents of various sizes. The machine can also be used to project the image of a microtape copy onto a veiwing screen. The machine includes developing solutions for developing and fixing photographic copies as soon as they are made.

There are many copying machines now available which can be employed to make copies of documents of various sizes. Generally, the machine makes only one size of copy and for this reason it does not contain the flexibility and usefulness that might be realized if various sizes were available. The present invention can reproduce documents in full size, make a copy of a document at 71% of the full size, make a microtape reproduction of a number of documents, and make enlarged prints from the microtape negatives. Another form of the copying machine provides a projector attached to the main copier to project the microtape images onto a screen for observation. Also, the machine is equipped to imprint a locator stripe on the microtape which makes it possible to scan a roll of microtape images at high speed and then slow down the tape to read only the desired frame.

The invention employs only three main lenses and a number of mirrors, each of which is adjustable so that different optical systems may be brought into play to produce the desired result. In this manner each optical component serves a number of purposes to produce different results.

An object of the present invention is to provide an improved copying machine which avoids one or more of the disadvantages and limitations of prior art machines.

Another object of the present invention is to include a plurality of optical systems in a single composite machine for making a number of copies of various sizes.

A further object of the present invention is to provide either a full size copy or a three-quarter size copy of a standard 8½ x 11 document.

Still another object of the present invention is to make microfilm copies on a continuous tape so that copies may be filed in a space which is only 6% of the space required to store the original documents.

Another object of the present invention is to project an enlarged image of a microfilm frame onto a viewing screen so that it may be observed by an operator.

A still further object of the present invention is to reproduce the data from a microfilm frame and photograph it onto a full size sheet.

The invention comprises a first cabinet which includes two rolls of sensitized paper, two lenses, and four mirrors. These components, when properly adjusted, provide three optical systems for copying documents. The machine also includes three lamps for furnishing the illumination necessary to photograph the document material. A multicontact switch is provided to switch from one set of components to another and to automatically make the necessary adjustments when changing optical systems. Other components such as motors, relays, and paper knives are employed in the machine and their function will be described later.

The invention consists of the construction, combination and arrangement of parts, as herein illustrated, described and claimed.

In the accompanying drawings, forming a part hereof are illustrated two forms of embodiment of the invention, in which drawings similar reference characters designate corresponding parts, and in which.

Figure 1:
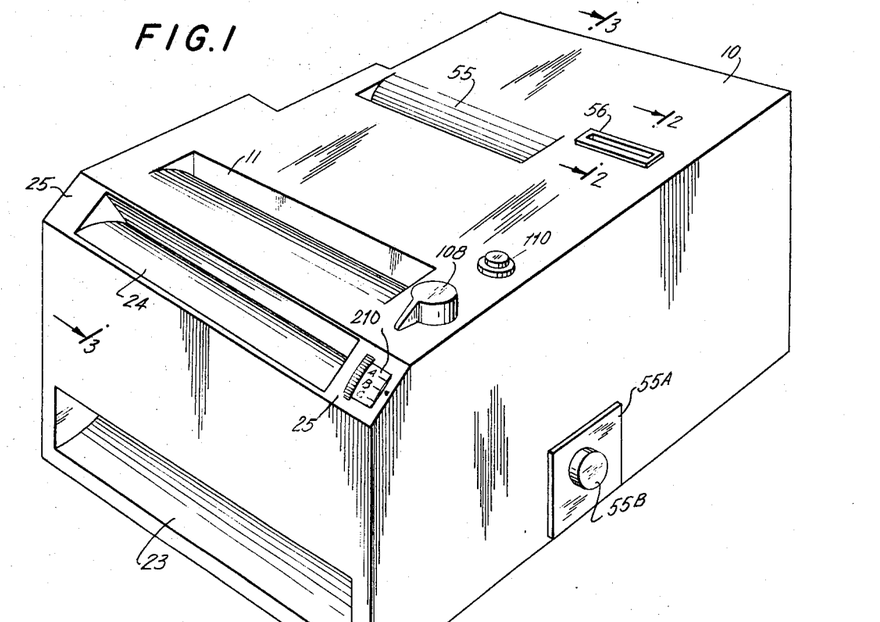
FIGURE 1 is a perspective view of one complete embodiment of the machine according to the present invention.
Figure 1A:
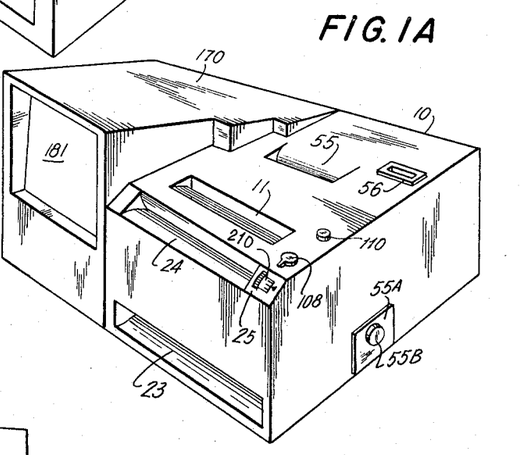
FIGURE 1A is another perspective view of a second embodiment of the machine showing an image projection device.
Figure 3:
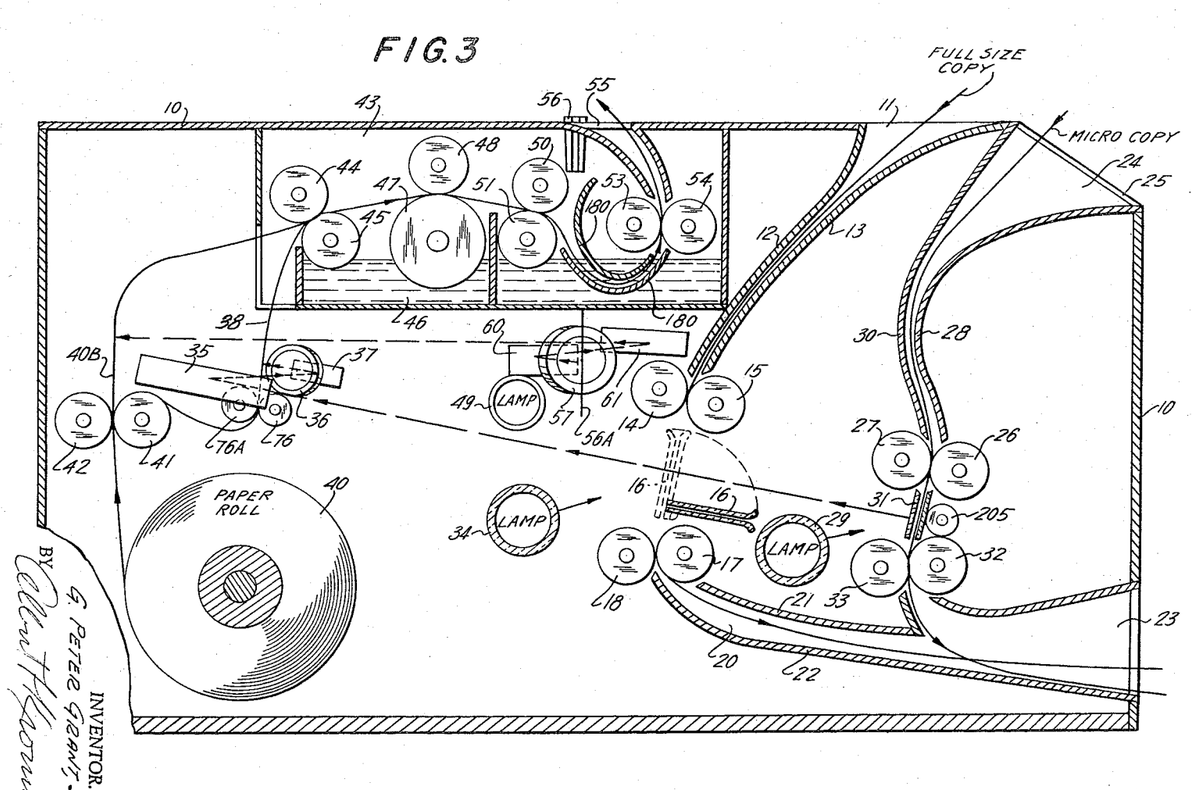
FIGURE 3 is a cross-sectional view of the machine shown in FIGURE 1 and is taken along line 3—3 of that figure. This view shows the general path taken by the various documents to be copied. It also shows the developing and fixing cabinet.

Referring now to FIGURES 1 and 3, the copying machine includes a cabinet 10 having a first entrance slot 11 for the admission of documents which are to be copied in a one-to-one ratio. This slot extends downwardly into the machine as shown in FIGURE 3, and is bounded by guide partitions 12 and 13, at the bottom of which are two rollers 14 and 15. When this slot is used, a glass guiding means 16 is moved into the position shown in dotted lines in FIGURE 3 so that the document will be retained in an object plane while passing through this portion of the machine. At the exit end of the guide 16, rollers 17, 18, are positioned for moving the document into an exit path 20, formed by partitions 21, 22. The document is moved to an exit chamber 23 where the operator may pick it up.

A second entrance slot 24 is positioned at the front of the machine on an angular control panel 25. This slot guides a document (not shown) toward rollers 26 and 27, located at the bottom of guide partitions 28 and 30. The document is directed by the rollers 26, 27, through a glass or transparent object guide 31. While in the guide 31 the document is illuminated by a lamp 29. As it emerges from the guide 31, the document is picked up by feed rollers 32, 33, and finally directed to the same exit chamber 23. While the document is moving through the glass chamber 16, a first lamp 34 is lighted to illuminate the document. Light reflected from the document in the guide 16 travels to a first mirror 35, then through a lens 36, a second mirror 37, and finally is focused onto a sensitized tape 38 which moves from a roll 40A, (see FIGURE 4) mounted in axial alignment with roll 40, through two power rollers 76 and 76A. The motion of the document as it is pulled through the object plane guide 16 by rollers 17, 18, is geared to correspond to the motion of the sensitized paper as it moves through the image plane adjacent to the lens 36 and the second mirror 37. After leaving the image plane, the sensitized paper is passed into a developing compartment 43 where feed rollers 44 and 45 and subsequently rollers 48, 50, and 53 pull the paper at the same rate of speed as it moves between rollers 76 and 76A and between rollers 41 and 42 at the rate of speed which corresponds to the speed of the document times the reduction ratio which in this case may be one twenty-fourth.

Figure 2:
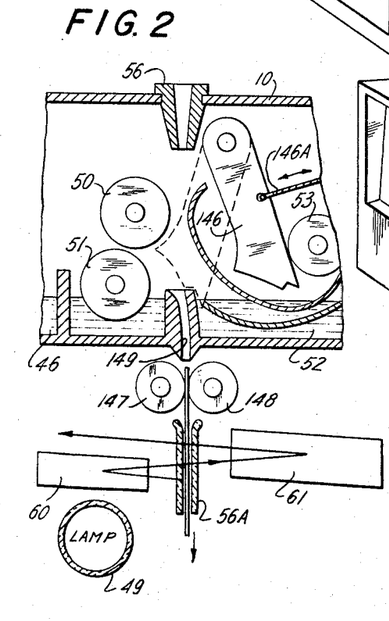
FIGURE 2 is a partial cross-sectional view taken along line 2—2 of FIGURE 1, and showing the entrance slot by which microfilm tape can be fed into the machine for copying on a larger sensitized paper.

As the film moves through the developing compartment 43, roller 45 picks up some of the developing solution 46 contained in a tank 19, at the bottom of the compartment. The solution wets the sensitized surface and starts the development of the image. The paper next passes over a roller 47 which is also in contact with the solution 46 and gets a further application of the developing solution upon its sensitized surface. Roller 48 bears against the opposite side of the paper to maintain contact and drive the paper in its desired path. After leaving the development section above the tank 19, the paper is directed through two other rollers 50 and 51, roller 51 being partly immersed in a fixing solution 52. Roller 51 applies the fixing solution to the sensitized surface, stops development, and fixes the image. After leaving rollers 50 and 51, the paper is directed downwardly so that it is entirely immersed in the fixing solution and all traces of the developing solution are nullified. In order to insure that developed prints be sent through the fixing solution and out through exit channel 55, a series of guide wires 180 are positioned, as shown in FIGURES 2 and 3, to retain the tape in its desired direction. The paper is then directed upwardly and out of the machine by two additional power rollers 53 and 54, emerging from an exit slot 55 so that an operator may remove it.

The developing and fixing baths are in a processing container which extends across the entire width of the machine. When paper from roll 40 is being used, the developed and fixed prints are ejected through slot 55. When paper from the narrow roll 40A is being used, it is processed through the same solutions and directed by the same rollers but, if a full sized positive print or a compact sized print is to be made, a negative deflector 146 (see FIGURE 2) is held by a spring (not shown) on 146A directly in the path of the paper to deflect it downwardly through slot 149 so that the paper is caught between rollers 147 and 148 (see FIGURE 2).

The cross-sectional view shown in FIGURE 3 omits the details of the deflector and slot 149 for the sake of clarity. The details are shown in a slightly enlarged cross-sectional view (FIGURE 2), where the normal deflector position is shown in dotted lines. When current is applied to solenoid 145, the deflector 146, is rocked by rod 146A to the position shown in solid lines.

Figure 8:
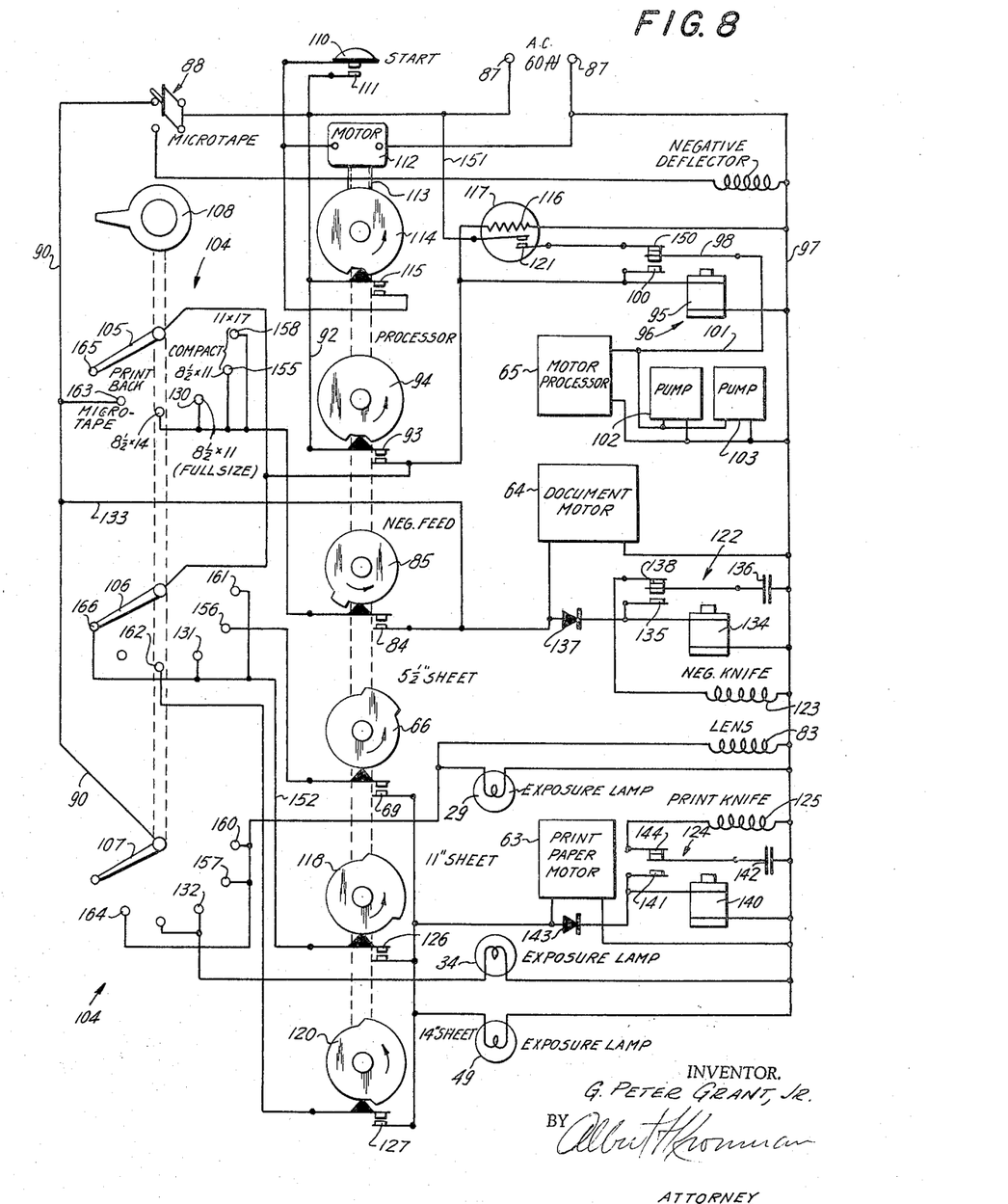
FIGURE 8 is a schematic diagram of connections showing the circuits necessary when only the copying device shown in FIGURE 1 is used.

It is often convenient to employ one or more automatic knives to cut off the paper after an operation. While these may not be always necessary, two knives (FIGURE 10) 123A and 125A are shown adjacent to rollers 41, 42, and 76, 76A. These knives are actuated by solenoids 123, 125 (FIGURE 8).

The above described process can be employed to furnish a negative copy which may be stored and later used to project through another lens system to make a full size copy of the original as hereinafter set forth.

Selected frames of the negative strip are entered through slot 56, shown in greater detail in FIGURE 2, and while passing through an object plane defined by plates 56A, the negative is illuminated by lamp 49, and the light from the document is reflected by mirror 60, through lens 57 (see FIGURE 3), then reflected by a second mirror 61, and the enlarged full size image is focused onto the sensitized paper 40B, prior to passing through the developing and fixing solutions. The copy is ejected through slot 55 where an operator may obtain it after being ejected by rollers 53, 54. The selected frames of the negative strip fall into a drawer 55A, directly below slot 56. The drawer 55A may be removed by pulling on knob 55B (see FIGURE 1).

It should be noted that only two lenses are necessary for the production of the above described copy sizes. When a reduced size copy is being made from a document entered between glass guide plates 31, the light rays are focused by lens 36 onto paper 38. When a full size copy is to be made, lens 36 must be moved a short distance to the position shown in dotted lines, 36A, in FIGURE 4. Then the image from the document in transparent guide 16 is focused on the same roll of paper 38, best shown in FIGURE 4. This paper, as described above, is then positioned in slot 56 and focused by lens 57 onto paper 40B.

FIGURES 1 through 4 show only the positions of the paper, the rolls and the document slots. In order to turn the rollers to move the documents and papers at the right speed, an arrangement of motors and belts is employed. These mechanical drives are shown in FIGURES 5, 6, 7 and 10.

Figure 10:
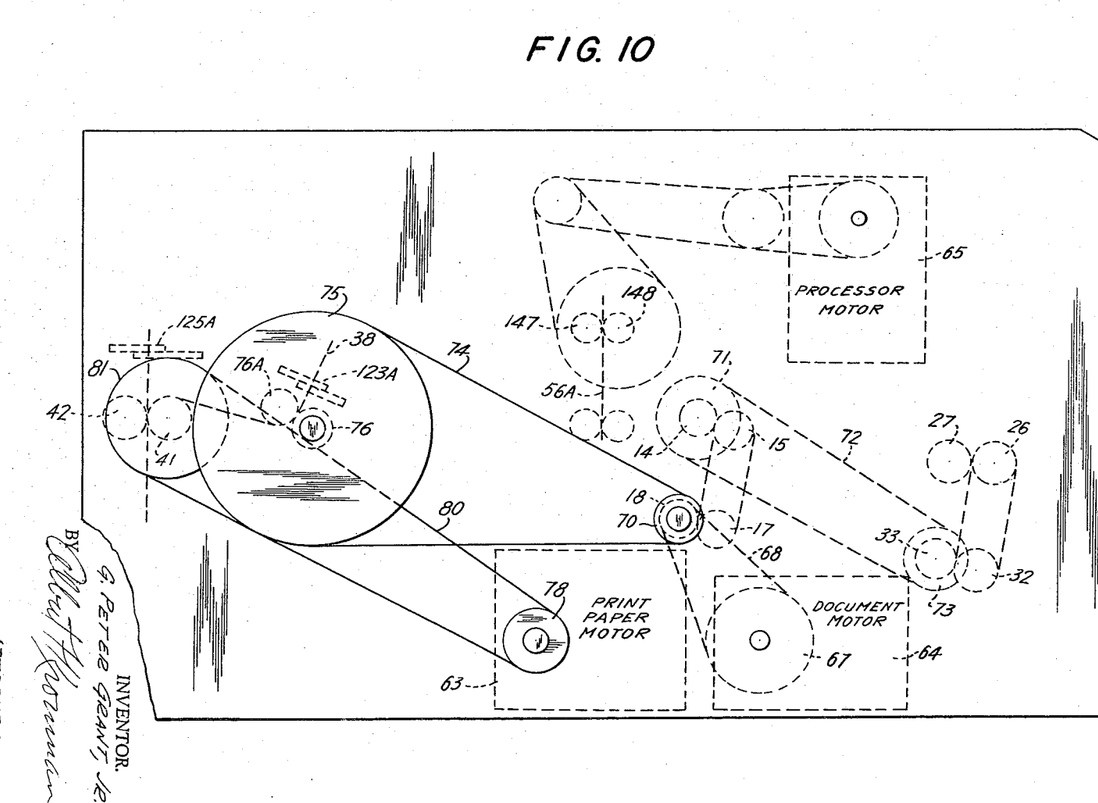
FIGURE 10 is a side view of the main cabinet, shown in FIGURES 1 and 7, and illustrates the manner in which the motors and rollers are connected.

FIGURE 10 indicates the position of three motors 63, 64 and 65. When a document (8½ x 11) is fed into opening 24 to make compact prints, motor 64 is switched on by cam 85, which closes contacts 84 (see FIGURE 8). This motor turns a pulley 67 and belt 68 to turn a double pulley 70 and rollers 17, 18, 14 and 15. An external pulley 71 is secured to roller 14 and a belt 72 turns another pulley 73 which gives power to rollers 26, 27, 32 and 33.

Pulley 70 also moves a belt 74 which turns another pulley 75, secured to roller 76. The roller 76 moves the sensitized paper 38 upward as it is directed through the image plane of the lens 36. The speed of all the rollers is designed so that, as a document moves downwardly through guide 31, the sensitized paper 38 moves up at a reduced speed, this reduction in speed being equal to the linear reduction in size provided by lens 36. Motor 64 is energized for a short time interval (about 1½ to 2 seconds) through contacts 84 operated by another cam 85 (FIGURE 8). This document motor 64 turns pulley 67 as described above, and operates rollers 14, 15, 17, 18, 26, 27, 32 and 33, to draw a document through either one of the object planes 16 or 31.

All of the above actions call for the movement of paper through the developing and fixing solutions and for this reason motor 65 is energized at the start of all operations. The circuit which energizes motor 65 is shown in FIGURE 8, and may be traced from the left hand terminal 87, over conductor 92, through contacts 93, which have been closed by cam 94, then through relay winding 95 of relay 96 and back to the other power terminal by way of conductor 97. This action actuates armature 98 and closes contacts 100, thereby sending current over conductor 101 to the processor motor 65, and also energizing both pumps 102 and 103. These pumps are mounted one above the other (see FIGURE 7) and they pump developing solution and fixing solution respectively from reservoirs into and out of the processing chambers 19 and 19A.

The circuit shown in FIGURE 8 contains all the components which assist in the automatic operation to copy documents of various sizes to produce prints of predetermined size. Power to operate the circuit is derived from an alternating current supply line which is to be connected to terminals 87. A microtape switch 88 connects one power terminal to conductor 90 and some of the contact points on a gang switch 104 having three rotatable arms 105, 106 and 107. The gang switch is set for each operation by a knob 108. A start button 110, operating contacts 111, is connected to a timing motor 112 and a locking cam 114, operating contacts 115, secured to the motor by a common shaft 113. Shaft 113 turns cams 94, 85, 66, 114, 118 and 120.

Locking cam 114 operates contacts 115 which are connected in parallel with start contacts 111, and as soon as the cam closes contact 115, the operator may release the start button. The locking cam insures that the shaft 113 turns a full revolution before stopping (generally set to take 15 seconds).

Cam 94 operates normally open contacts 93 and supplies current to motor processor 65 and two pumps 102 and 103. A thermal delay relay 117, having a heater 116, has its contacts 121 connected between terminal 87 and contacts 150, so that the processor system will be activated for a short time interval after motor 112 stops.

Cam 85 closes normally open contacts 84 for a short time (about 2 seconds) when the timing motor 112 is operated. Contacts 84 actuate the document motor 64 to move the document through the machine. Contacts 84 also activate a relay 122 which operates a solenoid 123 to cut off the paper when contacts 84 are opened.

Cam 66 closes normally open contacts 69 for about seven seconds to operate motor 63 and activate a second relay 124 and cut off the print paper when contacts 69 are opened. The paper knife is operated by solenoid 125. Cam 66 is used to roll a sheet of paper 5½ inches long through the machine to make a compact print.

Cams 118 and 120 operate normally open contacts 126 and 127 to activate the same motor and relay circuit as contacts 69. Cam 118 operates the print paper motor 63 long enough to pass an 11 inch sheet through the rollers. Cam 120 operates the motor long enough to pass a legal sheet of paper 14 inches long through the paper rollers.

In order to describe the operation of the circuit shown in FIGURE 8 and the related parts of the machine, let it be assumed that a full sized copy is desired. The operator inserts a sheet of paper 8½ x 11, into slot 11 until it limits against rollers 14 and 15. Knob 108 on the top panel is set at 8½ x 11 which moves arms 105, 106 and 107 to make contact with points 130, 131 and 132. Switch 88 is left open. Next, the operator presses the start button 110 for a moment and motor 112 starts, turning all the cams and closing some of the contacts under the cams. Shaft 113 is turned at a rate of about four revolutions per minute. Contacts 93 are closed and connect the left power terminal 87 by way of conductor 92 to relay winding 95 and conductor 97. The actuation of relay 96 moves armature 98 to close contacts 100, start motor 65 and pumps 102 and 103. Motor 65 is the processor motor and turns the rollers in the tanks. At this time current is sent through resistor 116 to heat up a bimetallic strip and close contacts 121.

At the same time, contacts 84 are closed by cam 85 and a circuit is completed which may be traced from terminal 87, over conductor 92, through contacts 93, arm 105, contact point 130, contacts 84, to document motor 64 and common conductor 97. Relay 122 is also actuated, closing contacts 135 and charging capacitor 136 through rectifier diode 137. Cam 85 closes contacts 84 for only about two seconds but this is long enough to move a document through the object plane defined by guide 16. During this two seconds lamp 34 is lighted by a circuit which can be traced, as before through contacts 84, conductors 133 and 90, arm 107, contact 132, the exposure lamp 34, and common conductor 97. At a later time cam 118 closes contacts 126 and sends current from arm 106 and contact 131, to motor 63, and the common conductor. As before, a relay 124 is actuated to close contacts 141 and charge capacitor 142.

Figure 4:
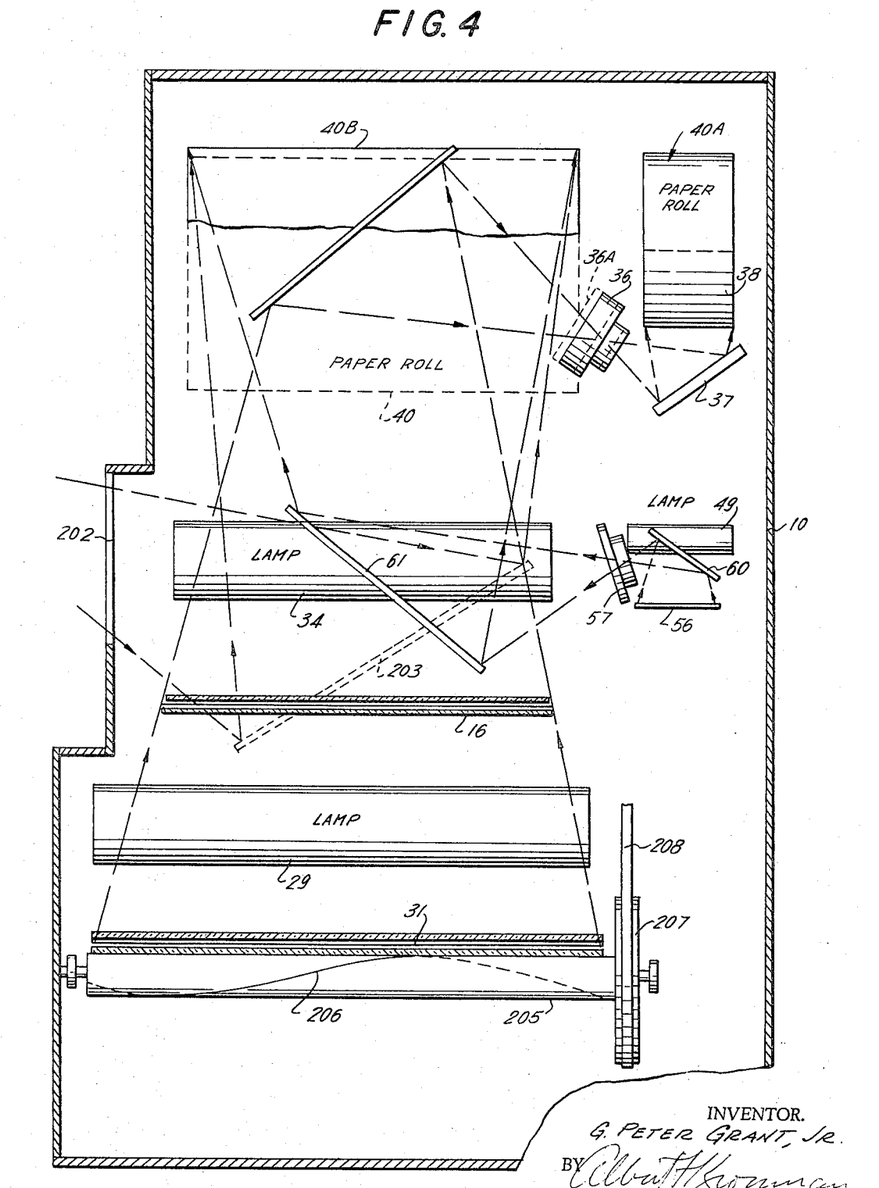
FIGURE 4 is a cross-sectional view of the machine shown in FIGURE 1 and illustrates the various optical combinations and the paths of light taken through them.

During this first time interval, the document to be copied moves through the object plane 16 and light from its surface is reflected by mirror 35, through lens 36, again reflected by mirror 37, and finally focused onto sensitized paper 38, from roll 40A (FIGURE 4). It should be noted that the document motor 64 turns not only rollers 14, 15, 17 and 18, to move the document through object plane 16, but also rollers 76 and 76A, to move print paper 38 through its image plane. The pulleys and belts which operate from document motor pulley 67 are shown in detail in FIGURE 10.

After about two seconds of this operation, the document has moved through its plane and the sensitized paper has been completely exposed. At this time, contacts 84 are opened by cam 85, and the document motor stops, relay 122 is normalized and knife 123A cuts paper 38, energized by solenoid 123 when contacts 138 are closed. For a short time interval (about 5 seconds) neither motor 64 nor motor 63 turn but the processor motor 65, energized by contacts 121 in the delay relay or by contacts 100, continues to operate to pass the cut-off paper through the developing and fixing solutions 46, 52.

The exposed (and now developed) paper 38 is guided by deflector 146 through slot 149 to pass between rollers 147, 148 and then under guide 56A to a position opposite lamp 49. At this moment cam 118 closes contacts 126 and current is applied from arm 106, over conductor 152, through contacts 126, to the print paper motor 63 and to relay 124. This action starts paper from roll 40, by means of rollers 41 and 42, to move through image plane indicated by paper 40B, lamp 49 is lighted and the recently developed and fixed negative image on paper is reflected to paper 40B, through lens 57 and mirrors 60, 61.

Paper 40B also passes through the developing and fixing solutions but it travels along a path which is to one side of the negative deflector 146 and therefore is directed through rollers 53 and 54 to exit at channel 55. The result is a positive, full-size copy of the original. As soon as cam 118 opens contacts 126, the armature of relay 124 is normalized, contacts 144 are closed, and the charge on capacitor 142 passes through solenoid 125 to operate knife 125A, and cut-off paper from roll 40. As before, the processor motor 65 continues to run, activated by delay relay 117 to completely develop, fix, and eject the cut-off paper.

A compact print of a document 8½ x 11" is made as follows: the operator turns the control knob 108 to 8½ x 11" compact, enters a document to be copied into slot 24 as far as it will go into the bite of the rollers (its 11" long edge next to rollers 26, 27) and then presses the start button 110. As before, cam 114 closes contacts 115 for about fifteen seconds, energizes conductor 92 and, as soon as cam 94 closes contacts 93, current is sent to the delay relay 117, to relay 96, and to arms 105 and 106. The current supplied to arm 105 is applied to contacts 84 by way of contact 155 and, as before, motor 64 is energized for about two seconds to move the document through the object plane 31 and to move the negative paper 38 through its image plane. At the same time, arm 106 supplies current to contact point 156 and arm 107 supplies current to contact point 156 and arm 107 supplies current to contact point 157. Current through conductor 90 and arm 107 lights exposure lamp 29 and energizes lens solenoid 83 to reposition the lens 36 and illuminate the document as it passes through the object plane. As soon as contacts 84 are opened, the lamp 29 goes out, the lens 36 is returned to its normal position, and motor 64 stops. At this time relay 122 is normalized and the knife 123ᴬ is actuated by solenoid 123. As before, the processor motor 65 keeps running through contacts 100 as the 15 second cycle continues.

A short time after motor 64 stops (about 6 seconds) cam 66 closes contacts 69 and current is supplied through arm 106, contact 156 and contacts 69, to the print paper motor 63, relay 124, and lamp 49. The action is the same as described above in connection with the full size copy except current is supplied through contacts 69 instead of contacts 126, and the printing time is shorter. The cut-off portion of the negative print is moved into drawer 55ᴬ while the cut-off portion of positive print from roll 40 moves on to rolls 53, 54, to pass out the exit slot 55. Thermal delay 117 continues to pass current to processor motor 65 through contacts 121 for an additional period of time.

A compact print of a legal sized document can be made by dropping the document into slot 24 with its longer edge parallel to rollers 26 and 27. Knob 108 is moved to the compact 11 x 17″, and as before, when the start button is depressed current flows through contacts 115, 93, arm 105, contact 158, through contacts 84 to motor 64 and relay 122. The document is moved through rollers 26, 27, as before in about two seconds, during which time it is illuminated by lamp 29 which receives its current from arm 107 and contact 160. As before, lens 36 is moved a short distance by solenoid 83 to focus the surface of the document onto the image plane 38 occupied by sensitized paper from roll 40ᴬ. Arm 106 is now in contact with contact point 161 which applies current to contacts 126 which are closed by cam 118 about five seconds after motor 64 stops. The remainder of the operation is the same as that described above.

When the operator wishes to make a full size copy of a legal paper which is 8½ x 14, the document is placed in slot 11 with the 8½″ edge of the paper in contact with rolls 15 and 14. The operation is the same as that described above for the full size 8½ x 11 sheet except that arm 106 makes contact with point 162 and current is thereby applied through contacts 127 to motor 63 and relay 124 for a longer time interval.

In order to make a microtape record, knob 108 is turned to microtape contact 163 and switch 88 is closed. Switch 88 sends current through the negative deflector solenoid 145, causing the deflector 146 (FIGURE 2) to be withdrawn from the path of the paper from roll 40ᴬ. Also, one blade of switch 88 applies current to conductor 90 and arms 105 and 107 for as long as this switch is closed. Processor motor 65 and document motor 64 are both turned on by this switch. Start switch 110 is not closed, motor 112 is not turned on. The operator enters the documents to be copied into the slots 24 and rollers 26, 27, 32 and 33 run the document through the object space 31 and out through the exit channel 23. It should be noted that contacts 84 which are generally closed for only about two seconds are now short-circuited by conductor 90 and conductor 133 which keeps the document motor 64 turning as long as switch 88 is closed. This means a continuous unbroken tape of negative print material will be moved through the processor 43 and out through exit channel 55. It also means that arm 107 passes current to contact 164 to energize the lens solenoid 83 and light exposure lamp 29. The operator may enter as many documents as he pleases into slot 24 and have them all copied on a single strip of negative paper which is available at exit slot 55. When the operator has finished entering documents, switch 88 is manually opened and motor 64 stops, relay 122 is normalized and solenoid 123 receives energy from capacitor 136 to operate knife 123ᴬ and cut off the negative strip. Because of the delay circuit 117, the processor motor 65 continues to operate for an extended time interval. This insures that the total length of the microtape strip passes through the processing solution.

There are many occasions when an operator desires to print a full size document from a microtape print. In order to do this the print is selected and removed from the roll. It is necessary to leave some additional space on either side of the frame to be printed. In one model of the invention, a three inch strip is cut from the roll. Then the operator turns knob 108 so that arm 105 makes connection with the print-back contact 165 and arm 106 thereby provides current from closed contacts 93, to contacts 166, conductor 152 and contacts 126, to motor 63 which runs the printing rollers 41 and 42. The film strip is entered through slot 56 and pushed down all the way until it comes in contact with rollers 147, 148. The start button is now depressed and contacts 115 and 93 are closed as before, actuating the processor motor 65 to send the sheet of sensitized paper from roll 40 through the processing solutions, and also to rotate rollers 147 and 148.

The optical system includes the object plane 56ᴬ, mirrors 60 and 61, lens 57 and the image paper plane 40ᴮ. When motor 112 causes cam 118 to close contacts 126, lamp 49 is turned on and motor 63 moves paper from 40ᴮ. The lamp illuminates the negative strip and a positive print is obtained on the paper from roll 40.

Figure 5:
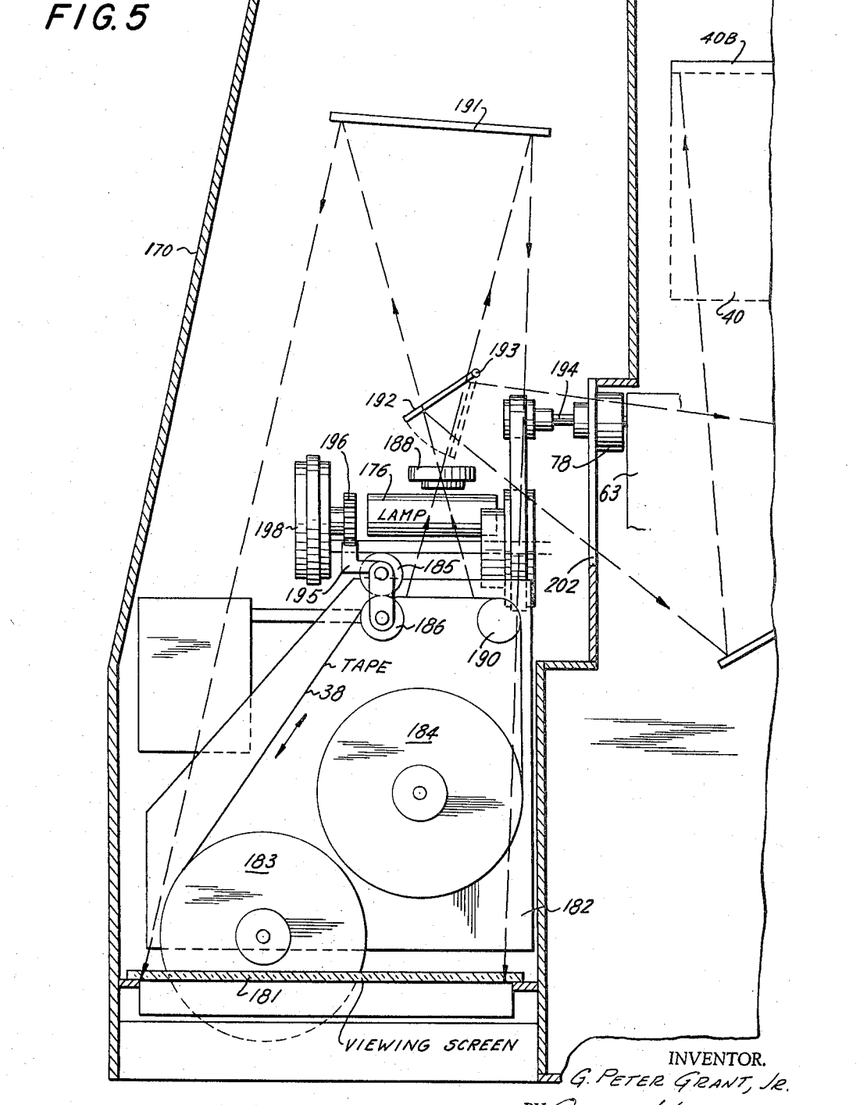
FIGURE 5 is a cross-sectional view of the projection section which is located at the left side of the machine shown in FIGURE 1A. This view shows the optical components used when projecting images of microfilm frames.
Figure 6:
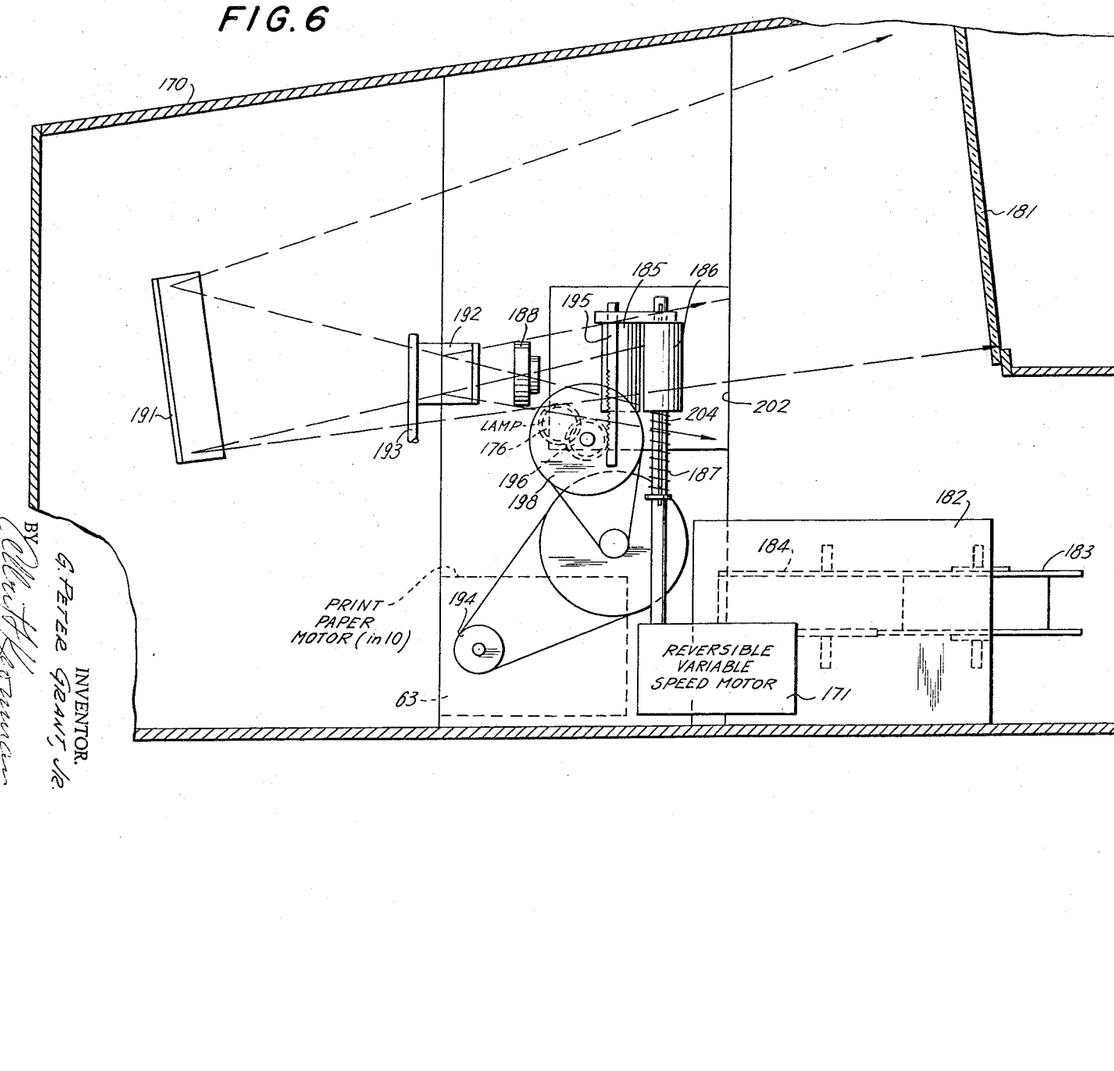
FIGURE 6 is a cross-sectional view of the projector shown in FIGURE 5 and shows the interior in a side view.
Figure 7:
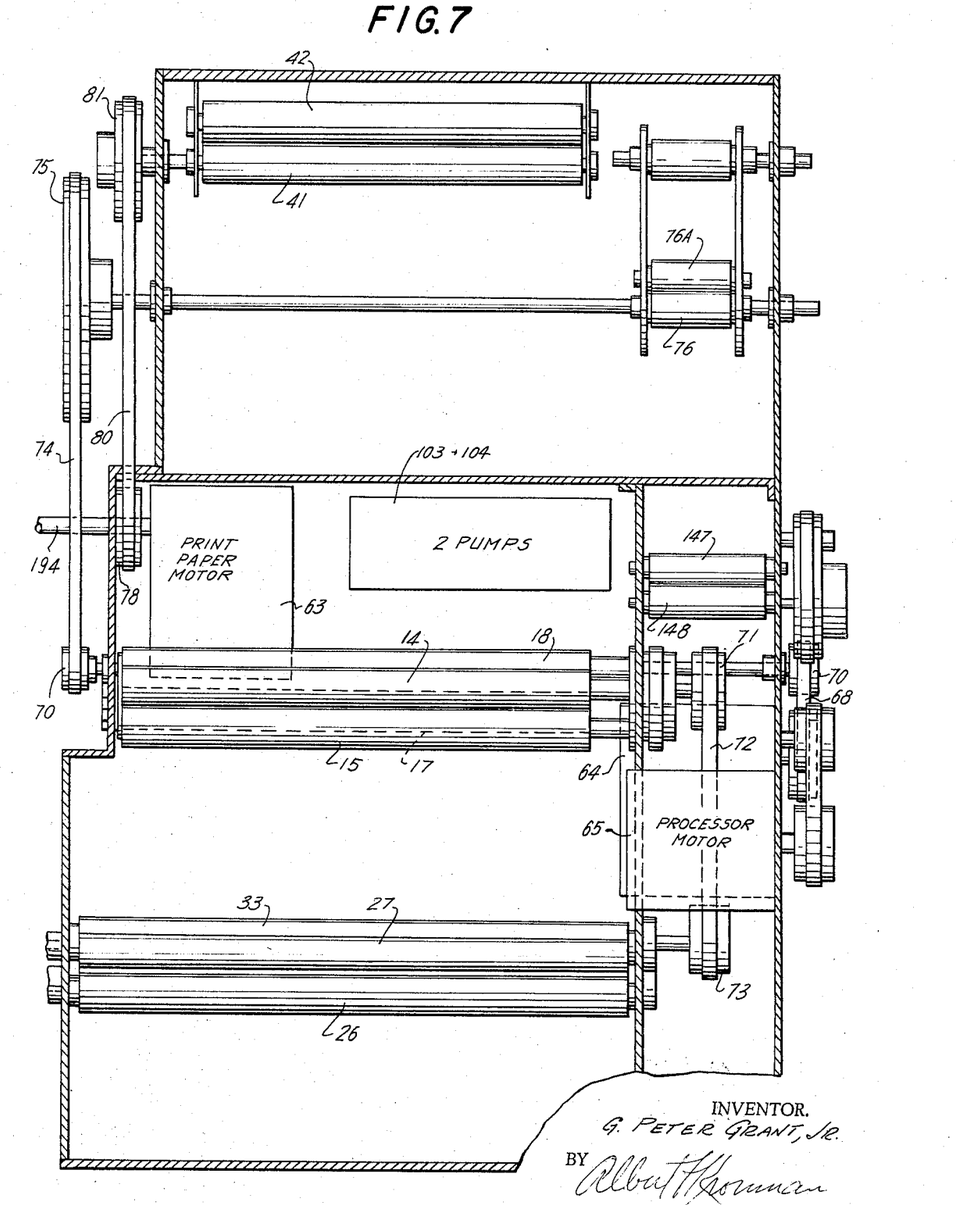
FIGURE 7 is a partial cross-sectional view of the machine shown in FIGURE 4 but showing only the motors, mechanical drives, and the paper rollers.
Figure 9:
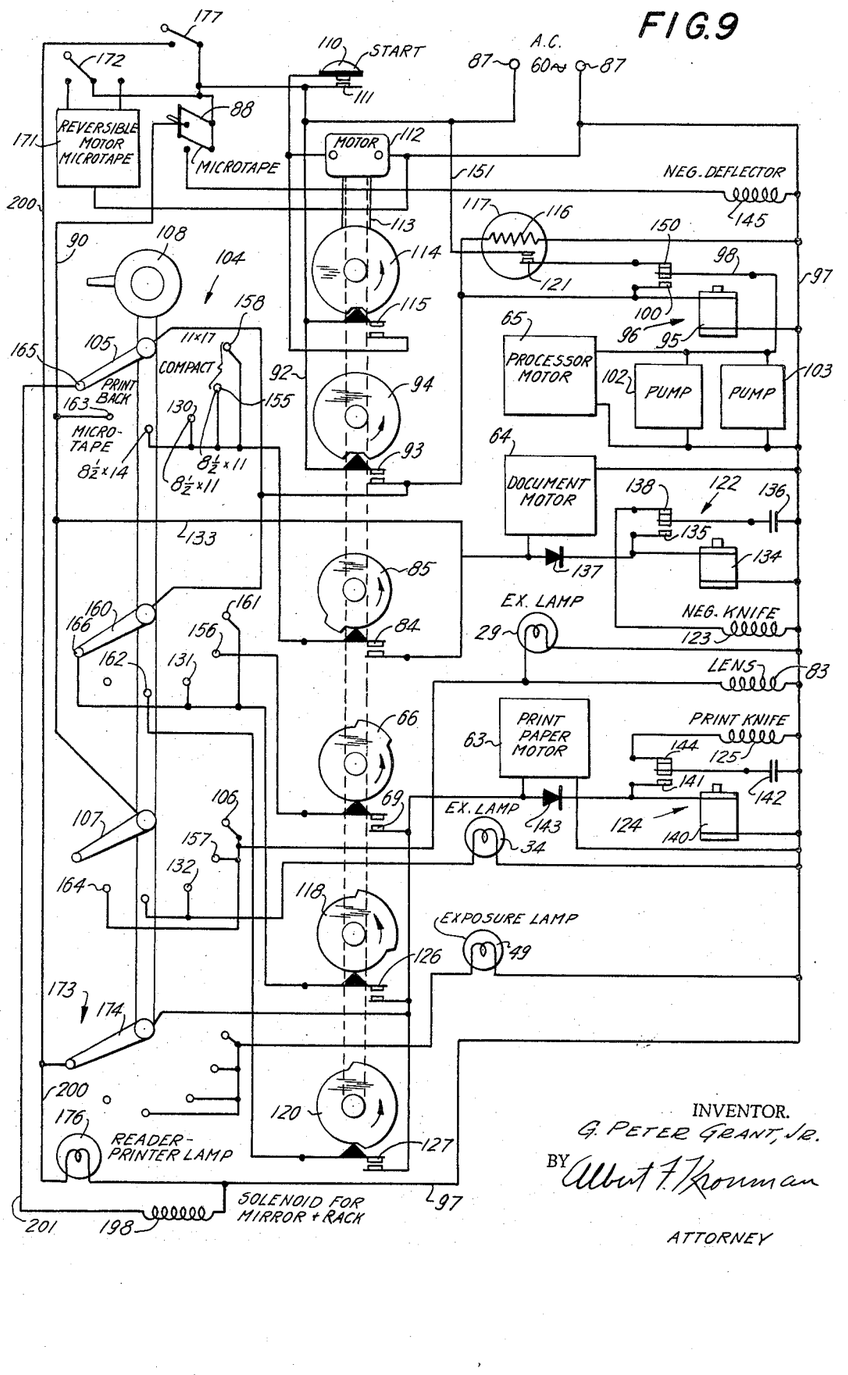
FIGURE 9 is another schematic diagram of connections necessary when the copying machine shown in FIGURE 1A is used.

The above described operations were for the copying machine shown in FIGURE 1. When it is desired to provide a viewing screen, the additional unit 170 is employed. The projector is secured to box 10. The internal details of the viewing box 170 are shown in FIGURE 5, and the wiring diagram for this additional piece of equipment is shown in FIGURE 9. It should be noted that one additional reversible motor 171 with a reversing switch 172 is added. This motor runs the microtape through the machine in either direction so that an operator may have additional flexibility in finding a desired print. A fourth dial switch 173 is also added onto the gang switch operated by knob 108, this switch having a rotating arm 174 and a plurality of contacts similar to those described above which are used for copying documents. The projection lamp 49 is connected to the first four contacts of switch 173 and a reader lamp 176 is added. The reader lamp 176 is turned on by switch 177. The rest of the circuit is substantially the same as that shown in FIGURE 8 and all components are similar.

The additional compartment includes a viewing screen 181, which may be recessed a short distance from the front side of the compartment to provide the equivalent of a light hood. On the inside, near the base, a carton 182 is positioned. This carton holds a wind-up spool 184 and a spool 183 of microtape 38 which can either be shown on the screen 181 or copied by printing onto paper from roll 40. Two rollers 185 and 186 are coupled by a splined shaft 187 to the reversible feed motor 171 for pulling the tape through the object plane of a projection lens 188. An idler roller 190 holds the tape in position. Illumination for the tape 38 is furnished by the cylindrical reader lamp 176. A first mirror 191 is positioned near the back of the compartment for reflecting the light from a tape 38 and lens 188 onto the viewing screen 181. A second mirror 192 is mounted on a pivoted shaft 193 for turning the mirror to intercept the light beam when copies are to be made. When using the viewing screen, mirror 192 is turned to one side as indicated by the dotted lines in FIGURE 5.

The above described components are all that are necessary for viewing the microtape on a screen. It is obvious that the entire frame can be seen when properly rolled into place. However, for printing on paper from the large roll 40, the tape and the paper must be both moved in a vertical direction, the tape moves down and the sensitized paper moves up. Both are displaced by print paper motor 63, positioned at the left side of compartment 10 (FIGURE 7) and connected to the components in compartment 170 by an extension shaft 194. In order to move the microtape down, a rack 195 is moved into engagement with a pinion 196, run by a pulley 198 coupled to the print paper motor 63. The movement of the rack and mirror can be accomplished by a lever but it is more convenient to employ a solenoid winding 198 (FIGURE 9) and plunger.

The operation of this portion of the invention is as follows: Referring to the wiring diagram of FIGURE 9, and to FIGURES 5 and 6, the operator inserts carton 182 into the base of compartment 170 and threads the microtape through rollers 185 and 186. Then the microtape switch 88 is left open, switch 177 is closed, and the start button is not depressed. Knob 108 is set at Print-Back. Current from terminal 87 is applied through switch 177 and conductor 200 to lamp 176 which illuminates the tape and produces an image on screen 181 by means of the optical system described above. At this time no current is applied to solenoid 198 so that the rack 195 is disengaged and mirror 192 is moved out of the way of the focused beam of light.

The operator can now operate the reversible motor 171 by the use of switch 172. It is also contemplated to provide a variable speed drive for speeding up and slowing down the motor. Such a drive is not shown in the drawings since the details are well known. The operator may stop the tape at any position for study of the projected image.

If the operator desires a full-sized print of any frame in the tape, the frame is first positioned on the screen and then, with knob 108 set at Print-Back, the start button is depressed. Motor 112 starts as before, and contacts 115 and 93 are closed by their adjoining cams. Contacts 93 send current through arm 105, contact 165, and conductor 201 to solenoid winding 198 to move mirror 192 to intercept the light beam and to engage rack 195 with pinion 196. Contacts 93 also start the processor motor 65 which moves the exposed paper through the developing and fixing tanks. Contacts 84, closed for about two seconds, receive no current from arm 105. After about seven seconds, contacts 126 are closed and current is supplied to the print paper motor 63 by way of contacts 93, arm 106, contact 166, and contacts 126. Contacts 126 are kept closed for about six seconds and during that time the print paper from roll 40 is moved up through the image plane 40B, light from micro-tape travels from the tape 38 through lens 188, then is reflected by mirror 192, to compartment 10 through aperture 202, then again reflected by mirror 203 (shown in dotted lines in FIGURE 4) and is finally focused onto paper from roll 40.

Motor 63 is also coupled (by means of shaft 194 and other pulleys and belts) to pinion 196 and rack 195. Rack 195 moves all three rollers 185, 186 and 190 down at a speed which is a predetermined fraction of the upward speed of paper 40. The downward movement continues until contacts 126 are opened by cam 118. At this time motor 63 stops, knife 125A cuts the print paper, and, as soon as contacts 93 are opened, the rack is disengaged from the pinion, and a spring 204 moves the rollers back to their normal position. The processor motor continues to turn to develop and fix the print paper. When contacts 93 are opened, the operator is again free to move the film by motor 171 and view the screen 181.

When the two compartments are combined, all the copying and printing operations of the first compartment 10 are still available if the operator wishes to use them.

For the sake of clarity, some of the components have been omitted from some of the drawings. For example, the knife and deflection solenoids, shown in the wiring diagram have been omitted from FIGURES 3, 4 and 10. The exact details of these components are not a part of the invention.

One of the features of the invention is the use of an index line projected and developed on the tape between frames of the microtape. The index line, runs between frames and its position across the width of the tape provides an approximate measure of the subject classification of the frame in the length of the tape. The line is put on the tape by a simple cylindrical roller 205 (see FIGURE 4) on which is printed a black helical line 206, like a coarse screw thread, and a portion of the line is photographed between documents when a long microtape record is being made. The roller 205 is positioned directly behind the object plane defined by glass plates 31 and is illuminated by lamp 29 when no documents are being photographed.

The roller 205 may be turned by the operator by means of pulley 207 and belt 208 to a wheel 210 having the letters of the alphabet around its rim. When microtaping documents filed under "C" the operator turns the wheel to "C." This places the black helix at a position about one inch in from one end. The microtape will then produce a white line just in from one side. When projected onto the screen 181 this white line will appear horizontally and about one inch down from the top and opposite the letter "C" in an alphabet listed vertically at the edge of the screen 181.

From the above description of the copying machine and its operation, it is evident that a flexible device has been developed, capable of performing a large number of copying operations with a minimum of equipment. The machine also permits an operator to select a desired frame in a microprint tape and obtain an enlarged print of the frame in fifteen seconds.

Having thus fully described the invention, what is claimed as new and desired to be secured by Letters Patent of the United States is:

1. A photographic document copying device for producing positive copies comprising; a first transparent supporting means for positioning a document in a first object plane, first lamp for illuminating the document within the first supporting means, a first sensitized flexible strip mounted for movement through a first image plane, means for focusing the light from a document in the supporting means onto the sensitized strip, a developing and fixing means for sequential operation on the first strip to produce a negative copy of the document, roller means for moving a document through the first supporting means and for moving the strip through the image plane, additional roller means for moving the strip through the developing and fixing means, a second transparent supporting means for positioning said first flexible strip in a second object plane after being developed and fixed, a second lamp for illuminating the strip in the second supporting means, a second sensitized flexible strip mounted for movement through a second image plane, means for focusing the light from the first strip onto the second strip, and roller means for moving the second strip through the second transparent supporting means and through the developing and fixing means to produce a positive copy.

2. A photographic document copying device for producing positive copies of a document comprising; a first transparent supporting means for positioning a document in a first object plane, a first lamp mounted adjacent to said plane for illuminating the first supporting means, a first sensitized flexible strip mounted for movement through a first image plane, optical means for focusing the light from a document in the supporting means onto the sensitized strip, said optical means including a lens and two mirrors, a developing and fixing means for sequential operation on the first strip to produce a negative copy of the document, a first roller means for moving the document through the first supporting means and for moving the strip through the image plane, said roller means coupled to an electric motor, additional roller means for moving the strip through the developing and fixing means, a second transparent supporting means for positioning said first flexible strip in a second object plane after being developed and fixed, a second lamp mounted adjacent to said second supporting means for illuminating the strip, a second sensitized flexible strip mounted for movement through a second image plane, means for focusing the light from the first strip onto the second strip, and a second roller means for moving the second strip through the second supporting means and through the developing and fixing means to produce a positive copy.

3. A copying device as claimed in claim 2 wherein said electric motor coupled to the roller means moves the document at a predetermined speed and moves the first strip at a speed which is equal to the document speed divided by the linear optical reduction ratio.

4. A copying device as claimed in claim 2 wherein a second electric motor is coupled to the second roller means for moving the second strip through the second image plane at a speed which is equal to the speed of the first strip times the linear optical enlargement ratio.

5. A copying device as claimed in claim 2 wherein all of said image and object planes, focusing means, lamps, and sensitized sheet are contained within a single housing, with an entrance slot for entering a document, and an exit slot for delivering the positive print.

6. A copying device as claimed in claim 5 wherein a second entrance slot is provided for entering a document into a third object plane whenever a print of reduced size is desired, said device also including a means for rotating the first transparent supporting means to a position where it is not in line with the light from said object plane, a third lamp for illuminating said third object plane, and a solenoid for moving a portion of the focusing means to accommodate the longer object distance.

7. A copying device as claimed in claim 5 wherein a plurality of shearing knives are positioned respectively adjoining said first and second sensitized strips for cutting the strips at the end of an exposure operation, a solenoid for each knife, each solenoid having a plunger coupled to its knife for operating the knife whenever the solenoid is supplied with electrical power.

8. A photographic document copying device comprising; a first photographic system including a document support, a first focusing means, a negative sensitized sheet for receiving an image of a document formed by the first focusing means, and a developing and fixing means for operating on the negative paper; a second photographic system including the developed and fixed negative sensitized sheet, a second focusing means, a positive sensitized sheet for receiving an image of the negative sheet formed by the second focusing means, and said developing and fixing means; a first set of rollers for moving a document through the document support and for moving the negative paper through a first image plane, said first set of rollers coupled to an electric document motor; a second set of rollers for moving the negative and positive sensitized sheets through the developing and fixing means and for moving the negative sheet through a second object plane, said second set of rollers coupled to an electric processing motor; and a third set of rollers for moving the positive sensitized sheet through a second image plane, said third set of rollers coupled to an electric print paper motor.

9. A photographic document copying device comprising; an electric document motor coupled to a first set of rollers for moving a document through a first object plane and for moving a negative paper sheet through a first image plane, an electric processing motor coupled to a second set of rollers for moving the negative and positive sensitized sheets through a developing and fixing means, an electric print paper motor for moving the positive sensitized sheet through a second image plane, and a cam motor for turning a cam shaft one revolution during a copying operation, said cam motor for operating a plurality of cams to open and close contacts in series with a pair of power terminals and the document motor, the processing motor, and the print paper motor in a predetermined sequence during the copying operation, and a negative fed cam coupled to said cam motor which cam includes a cam face which closes a pair of contacts for connecting the document motor to a source of electric power for a time interval which is long enough to move a document through a first object plane.

10. A copying device as claimed in claim 9 wherein a selected print paper cam is coupled to said cam motor and includes a cam face which closes a pair of contacts for connecting the print paper motor to a source of electric power for a time interval which begins after the document motor has stopped and ends after the print paper has been exposed to a complete document image.

11. A copying device as claimed in claim 10 wherein a plurality of print paper cams, each with a pair of contacts, are provided on a cam shaft coupled to the cam motor for providing time intervals of varying duration and wherein a manual switching means is provided for selectively switching the power to a desired pair of contacts.

12. A copying device as claimed in claim 9 wherein a thermal delay is provided for connecting the electrical power terminals to the processor motor for an extended time interval after the processor cam contacts have been opened, said delay relay including a heater and a pair of temperature sensitive contacts, said heater connected to one of the power terminals and said cam contacts, said temperature sensitive contacts connected between one of the power terminals and said processor motor.

13. A copying device as claimed in claim 11 where said contacts operated by the print paper cam are connected respectively to a plurality of exposure lamps for illuminating the objects in any of said object planes for the duration of the printing operation.

14. A copying device as claimed in claim 10 wherein one of said cams on the cam shaft is for continuing the rotation of the shaft for a complete revolution, said cam including a cam face which closes a pair of contacts connected in series between one of the power terminals and a terminal on the cam motor.

15. A photographic document copying device comprising; a first photographic system including a first document support defining a first object plane, a first lamp for illuminating a document in the support, a lens for focusing the light received from the document, and a sensitized sheet positioned in an image plane for receiving the focused light rays from the lens; a second photographic system including a second document support parallel to the first defining a second object plane, a second lamp for illuminating a document in the second support, the lens in the first system, and the sensitized sheet in the first system; and a solenoid operated mechanical means for moving the lens from a first focusing position, where light from the first object plane is focused onto the image plane, to a second focusing position where light from the second object plane is focused onto the image plane.

16. A copying device as claimed in claim 15 wherein a manual dial switch and a source of electric power control the position of the focusing lens and control the selection of the first or second lamp to be lighted.

17. A copying device as claimed in claim 15 wherein a developing and fixing device is positioned adjacent to the image plane and is provided with mechanical rollers for moving the sensitized sheet from the image plane through the developing and fixing device.

18. A copying device as claimed in claim 15 where roller means is provided for moving the document through either the first or second object plane and additional roller means is provided for moving the sensitized sheet through the image plane, said roller means operating during an exposure operation and adapted to move a document and sheet at respective speeds which are proportional to the distance of the lens from the object plane and the lens from the image plane.

19. A copying device as claimed in claim 18 wherein a document motor is coupled by belts and pulleys to turn the roller means for moving documents through both the first and second document supports.

20. A photographic document copying device comprising: a document support including two transparent guide plates defining an object plane, a lamp for illuminating a document in the support, a lens for focusing the light from a document, a sensitized sheet positioned in an image plane of the lens, means for moving a document through the object plane at the same time the sheet is moved through the image plane, a rotatable marked roll positioned adjoining the guide plate more distant from the lens, said marked roll comprising a substantially white surface imprinted with a darker helical line, and means for rotating the marked roll whereby a portion of the darker line is photographed on the sensitized sheet at an identifiable position after each document has been moved through the document support.

21. A photographic document copying device comprising: a storage reel for storing a length of photographic film; a takeup reel for rewinding photographic film after being removed from the storage reel; viewing means for observing portions of the film, said viewing means including a lens for focusing light from the film, and a viewing screen positioned in an image plane of the lens; printing means including a manually rockable mirror and a sheet of sensitized paper, said mirror positioned normally out of line of the light during its passage from the film to the screen but adapted to divert the light from the lens to said sheet whenever it is desired to record a print; and a film moving means for moving the film in a direction at right angles to its length when an exposure is being made.

22. A photographic document copying device as claimed in claim 21 wherein said film moving means includes a rack and pinion coupled to a document motor.

23. A copying device as claimed in claim 22 wherein said film moving means is coupled to a set of rollers which move the sensitized sheet vertically in one direction while the film is moved vertically in the other direction.

References Cited
UNITED STATES PATENTS

| | | | |
|---|---|---|---|
| 3,220,302 | 11/1965 | Cuthbert et al. | 88—24 |
| 3,308,717 | 3/1967 | Okishima et al. | 88—24 |

NORTON ANSHER, *Primary Examiner.*

R. A. WINTERCORN, *Assistant Examiner.*